United States Patent [19]

Burkholder

[11] Patent Number: 4,570,574

[45] Date of Patent: Feb. 18, 1986

[54] CAGE DOOR FOR EASY ONE-HAND OPERATION

[75] Inventor: Harvey Z. Burkholder, Denver, Pa.

[73] Assignee: USI Agri-Business Company Inc., New Holland, Pa.

[21] Appl. No.: 674,930

[22] Filed: Nov. 26, 1984

[51] Int. Cl.⁴ ............................................. A01K 31/10
[52] U.S. Cl. .......................................... 119/17; 119/18
[58] Field of Search ............................ 119/17, 18, 48

[56] References Cited

U.S. PATENT DOCUMENTS

| | | | |
|---|---|---|---|
| 702,798 | 6/1902 | Johnson | 292/19 |
| 986,249 | 3/1911 | Walton | 119/17 |
| 1,656,282 | 1/1928 | Leon | 119/17 |
| 1,657,578 | 1/1928 | Markow | 119/17 |
| 2,641,493 | 6/1953 | Flugrath | 292/19 |
| 2,693,786 | 11/1954 | Babros et al. | 119/17 |
| 2,806,446 | 9/1957 | Hendryx | 119/17 |
| 3,244,146 | 4/1966 | Kurtz et al. | 119/17 |
| 3,492,971 | 2/1970 | Keen et al. | 119/18 |
| 3,498,267 | 3/1970 | Leeming | 119/18 X |
| 3,658,031 | 4/1972 | Coe | 119/18 |

Primary Examiner—Hugh R. Chamblee
Attorney, Agent, or Firm—Price, Heneveld, Huizenga & Cooper

[57] ABSTRACT

A cage door assembly for easy one-hand operation is disclosed. The cage door is comprised of a pair of legs secured to the ends of a base member. The door is hingedly secured to a cage. An L-shaped hook is attached to each of the free ends of the legs and these hooks engage with cage wires. The door is opened by squeezing the legs together which disengages the hooks from the cage wires. A bracket is positioned above the door and extends between the legs to prevent those legs from being squeezed together. The bracket can be moved from between the legs by pushing it upwardly with the index finger of the hand being used to open the door. The legs can be squeezed together to disengage the hooks from the cage wires once the bracket is removed from between the legs. The door can easily be opened with one hand. A cage assembly incorporating the cage door is also disclosed which has a feed trough upon which the door can rest upon when opened so as to provide a platform.

17 Claims, 7 Drawing Figures

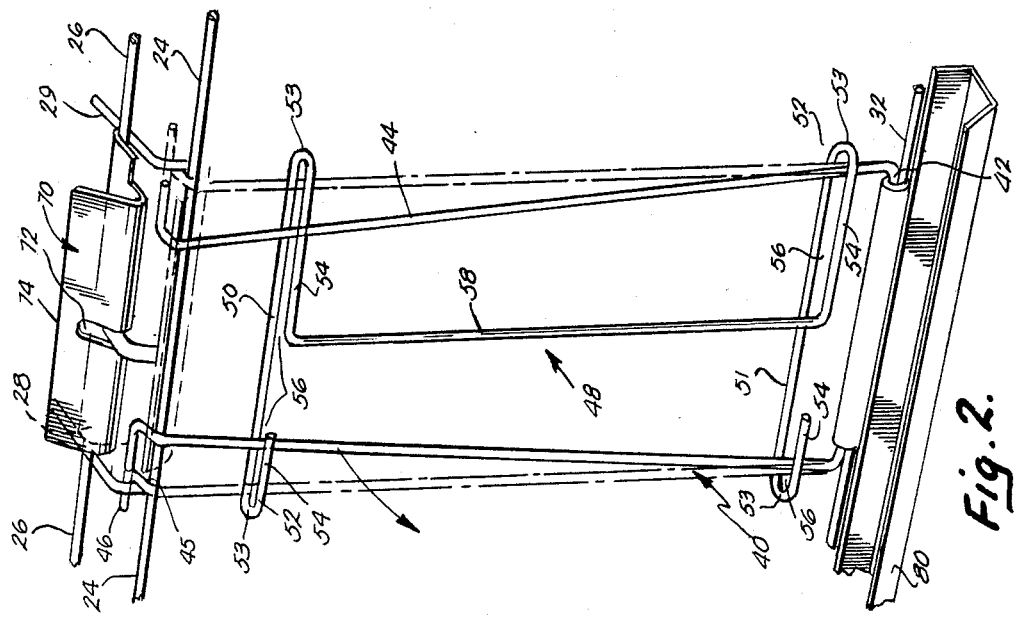
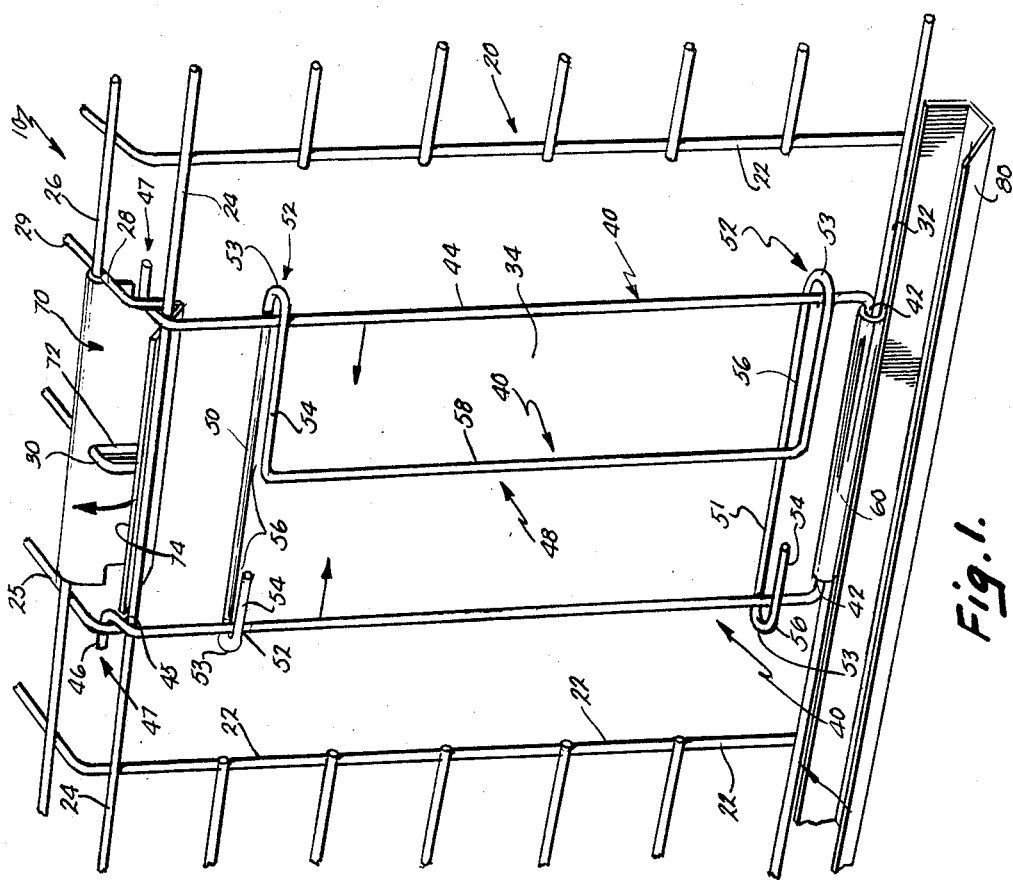

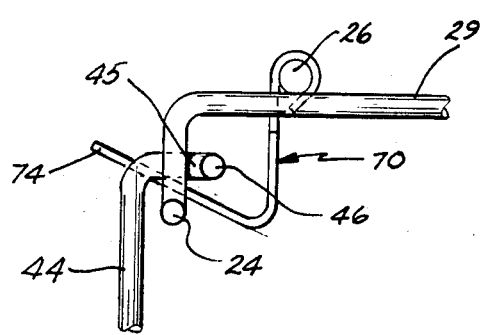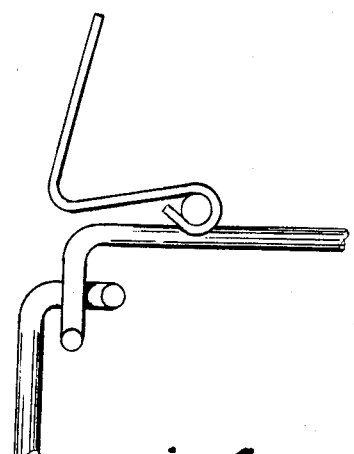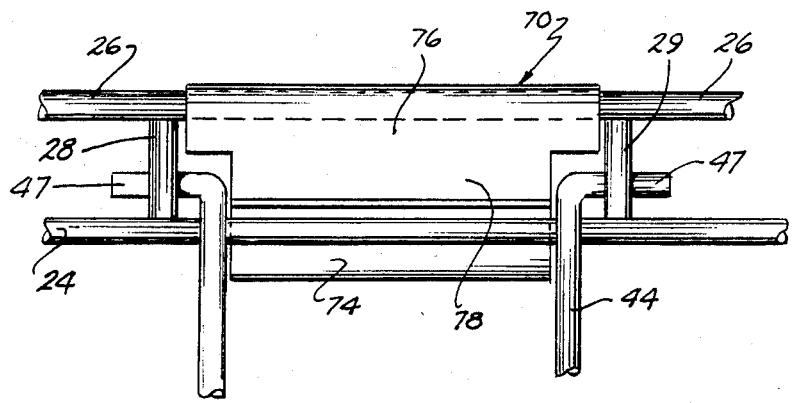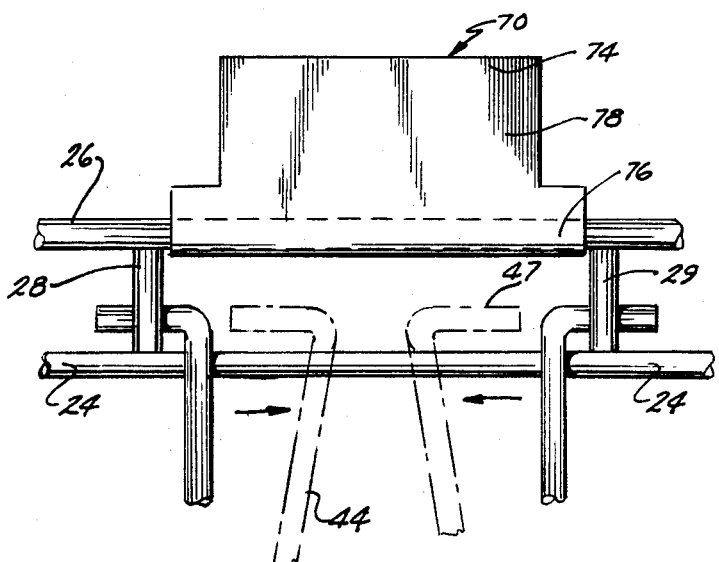

CAGE DOOR FOR EASY ONE-HAND OPERATION

BACKGROUND OF THE INVENTION

This invention relates to animal cages, and more particularly to a cage door assembly for such cages which remains securely locked when closed yet can be easily unlocked and opened with one hand.

In many farming and/or laboratory operations the small animals being raised must be removed from their cages for testing or artificial insemination purposes. In removing the animal from its cage a worker should have one hand on the animal at all times in order to prevent that animal from thrashing about or from escaping. Preferably the subject animal can be grabbed before the cage door is fully opened so that it does not bolt out of the partially or fully open door. It would thus be advantageous if the worker could open the door assembly with one hand, thus freeing his other hand for grabbing the animal before the door is fully opened. Further, the door assembly should be provided with a locking mechanism so that when it is in the closed position it is securely locked in order to prevent it from being accidentally opened by the animal.

Several cage door assemblies have previously been disclosed. For example, U.S. Pat. No. 2,693,786 to Babros, entitled DOOR FOR BIRD CAGES teaches a door which is retained in the closed, vertical position by a latch. The door, while easily opened by a worker, is subject to being accidentally opened by the animal held within the cage. A similar type of cage door is shown in U.S. Pat. No. 2,806,446 to Hendryx, entitled BIRD CAGE.

One method for preventing the accidental opening of a cage door is described in U.S. Pat. No. 3,244,146 to Kurtz, entitled POULTRY CAGE DOOR CONSTRUCTION. Kurtz discloses a door having a base with two elongated wire legs attached to the ends thereof. Attached to each of the free ends of the legs is a hook which engages with a portion of a wire cage when the door is in the closed position. The door is opened by squeezing the legs toward each other which causes the hooks to disengage from the wire portions of the cage. The door is retained in the closed position by an operating member which extends between the two legs. This door, while unlikely to be accidentally opened due to the positioning of the operating member, is rather difficult for a worker to open with one hand because the operating member must be slid down the legs of the door while the legs are simultaneously squeezed inwardly.

Consequently, a long felt need has existed for an improved gate assembly for animal cages which is easily opened with one hand yet remains securely locked when it is in the closed position. Further, such need existed for a gate of the above capabilities which, when opened, provides a platform for placing the animal which is held within the cage.

SUMMARY OF THE INVENTION

The present invention provides a cage door assembly which can be easily opened with one hand yet remains securely locked when it is in the closed position. The door is securely locked by a hinged bracket which extends between the legs of that door. The bracket prevents the legs of the door from being accidentally deformed which in turn prevents the door from being opened. The bracket, however, can be easily pivoted out from between the door legs by the index finger of the hand while simultaneously squeezing the legs to open the door. A worker can thus easily unlock and open the door with one hand while using his free hand to grab the animal held within the cage.

The cage assembly door of the present invention includes a base member which is hingedly secured to the base of the door and a pair of elongated legs which extend upwardly from the ends of that base member. An L-shaped hook is attached to each of the ends of the legs and these hooks engage with suitable receiving members such as cage wires or eyelet screws located above the door. The door is opened by squeezing the legs together which disengages the hooks from the receiving members.

The door assembly further includes a bracket which is connected to the cage, above the door, and which extends between the door legs. The bracket prevents the legs from being accidentally deformed, thus preventing the hooks from becoming disengaged from the cage wires or other suitable receiving members. The bracket can be easily moved from between the door legs by pushing the bracket upwardly with the index finger of the hand being used to open the door. Removing the bracket from between the legs allows the legs to be deformed. An operator can thus open the door by squeezing the legs together with one of his hands while simultaneously pushing the bracket upwardly with the index finger of that same hand.

BRIEF DESCRIPTION OF THE DRAWINGS

FIG. 1 is a perspective view of the cage and door assembly of the present invention in locked position;

FIG. 2 is a perspective view of the cage door assembly showing the cage door in unlocked position ready to be opened;

FIG. 3 is an enlarged sectional view taken upon line III—III of FIG. 1;

FIG. 4 is an enlarged sectional view taken upon line IV—IV of FIG. 2;

FIG. 5 is an enlarged front view of the locking bracket of the present invention in the locked position;

FIG. 6 is an enlarged front view of the locking bracket in the unlocked position.

DETAILED DESCRIPTION OF THE PREFERRED EMBODIMENT

Figure 7:
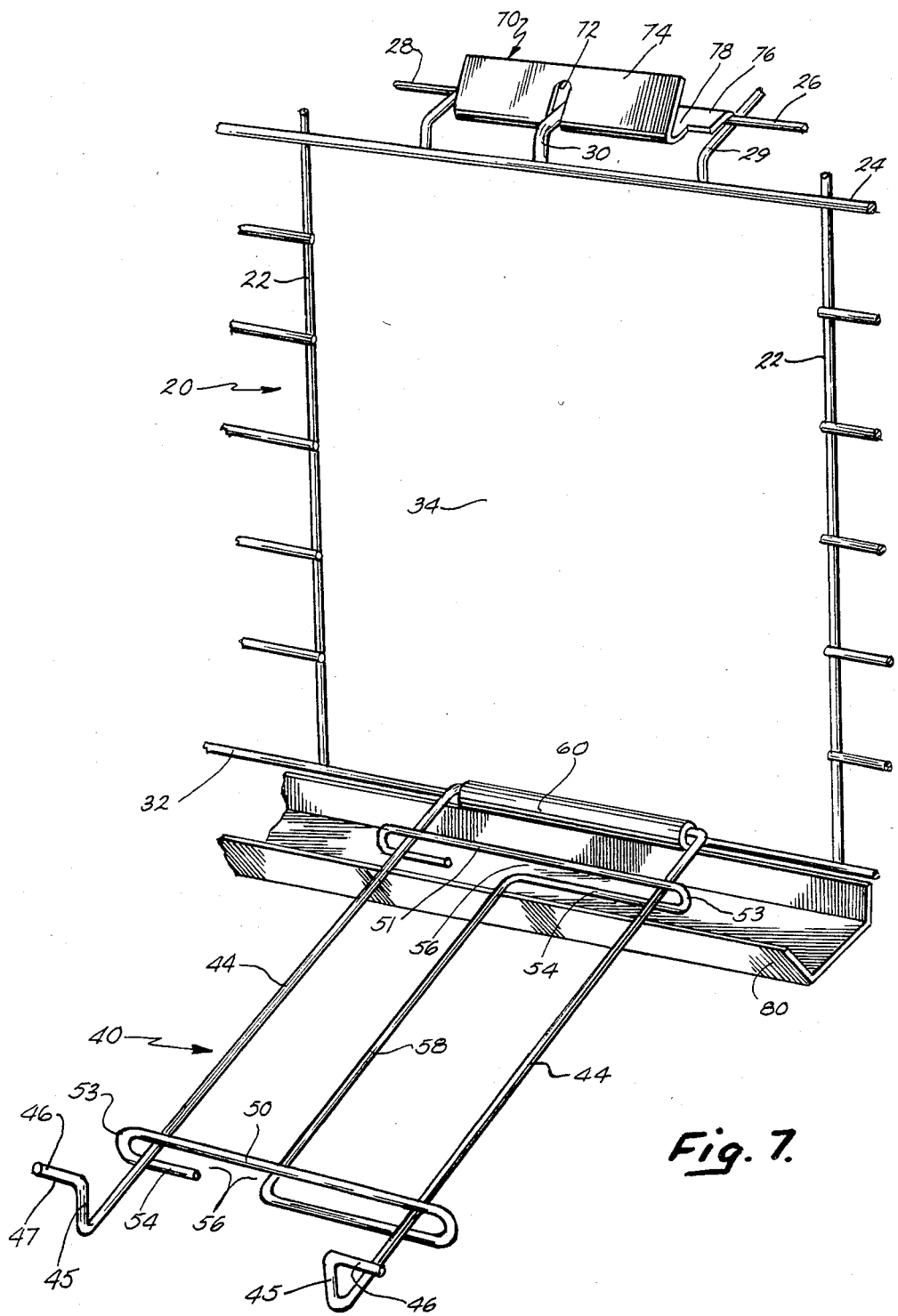
FIG. 7 is a perspective view of the cage door assembly showing the cage door in the fully opened position.

Referring to FIG. 1, the cage assembly 10 of the present invention includes a cage 20 having a door opening 34 in one side thereof. The cage assembly 10 further includes a cage door 40 which is formed from a pair of deformable wire legs 44 interconnected at their lower ends by a wire cross leg 42. The cross leg is pivotally attached to a portion of cage 20 which forms the base of door opening 34. This pivotal connection permits cage door 40 to be selectively positioned either over or away from door opening 34. Cage assembly 10 further includes a locking bracket 70 which is pivotally attached to a portion of cage 20 above door opening 34. Bracket 70, when in the locking position, extends between legs 44 to prevent the deformation thereof, which in turn prevents door 40 from being accidentally opened. When it is desired to open the door, bracket 70 is pivoted upwardly from between legs 44 thereby allowing those legs to be deformed.

The cage door 40 of the present invention can be used with various types of cages which have a door opening 34 in one side thereof for gaining access to the cage interior. Preferably, cage 20 is a wire-type cage formed of interconnected horizontal and vertical members which are secured together at their crossing points. In this type of cage, the door opening 34 is defined at the top by an upper horizontal wire member 24, at the bottom by a lower horizontal wire member 32 and at the sides by vertical wire members 22.

As shown in FIGS. 1 and 2, a door 40 is positioned over door opening 34 of cage 20. Door 40 is generally U-shaped, having a pair of elongated legs 44 which are connected together at their lower ends by cross leg 42. The cross leg is pivotally connected to a portion of cage 20 which lies below the base of door opening 34. When door 40 is used with a wire-type cage, the cross leg 42 is pivotally connected to lower horizontal wire member 32, preferably by a wraparound collar 60. This pivotal connection allows the door to be selectively positioned either over or away from door opening 34.

Elongated legs 44 are separated such distance that they can be easily grasped in the span of a hand. Further, legs 44 are preferably formed of a heavy stock, resilient wire which enables them to be resiliently deformed convergently and divergently with respect to each other over their entire length. The legs are so formed that they are naturally spring biased outwardly to assure that a light but consciously applied squeezing force is necessary to converge those legs toward each other.

When door 40 is positioned over door opening 34 the free ends of legs 44 extend over and are supported by upper horizontal wire member 24 which defines the top of door opening 34. The free end of each of the elongated legs 44 has a hook 47 integrally connected thereto. As shown in FIG. 1, and in detail in FIGS. 3 and 5, hooks 46 interengage with vertical cage wire members 28, 29 when door 40 is positioned over door opening 34. The hooks are disengaged from wires 28, 29 by squeezing legs 44 together.

Hook 47 is preferably L-shaped, having a first segment 45 which projects outwardly from elongated leg 44, in a direction perpendicular to the plane of door opening 34, and a second segment 46 which projects outwardly from the end of the first segment, in a direction perpendicular to the longitudinal axis of legs 44. The engagement between hooks 46 and vertical wire members 28, 29 retains door 40 in the closed position.

When door 40 is used with wire-type cages it is more economical and less complicated to engage hooks 47 with cage wire members. Other suitable means for receiving hooks 46 can be used however when the door 40 of the present invention is used with cages other than wire-type cages. For example, in wood or metal cages, eyelet screws could be located above the door opening to receive hooks 47.

In cage door assemblies of the type described above or in other prior art type of cage doors the doors have a tendency to accidentally open when an animal within the cage presses a portion of its body against that door. This problem has been solved by providing the cage assembly 10 of the present invention with a locking mechanism which prevents the accidental opening of door 40.

The locking mechanism of the present invention includes a bracket 70 which is pivotally attached to a portion of cage 20 above the door opening 34. As shown in FIGS. 5 and 6, bracket 70 is preferably T-shaped, having a first segment 76 which is pivotally connected to the cage 20, preferably to horizontal wire member 26, and a second segment 78 integrally formed thereto which has a width that is slightly less than the distance between elongated legs 44. In the locked position this second segment 78 extends between legs 44 of door 40 to prevent the accidental deformation of those legs. Legs 44 can be deformed, thus disengaging hooks 46 from cage wire members 28, 29, by pivoting bracket 70 upwardly, thereby removing second segment 78 from between legs 44.

The free lower edge of second segment 78 is preferably upturned to define a lip 74. This lip provides a surface upon which pressure may be exerted to pivot bracket 70 upwardly to the unlocked position. Further, bracket 70 is provided with a slot 72 through which projects a portion of vertical wire member 30 when bracket 70 is in the locking position. This locking mechanism of the present invention is easy to manufacture and operate, yet is very effective in preventing the accidental opening of door 70.

In operation, only one hand is needed to unlock and open the door. To open the door, the operator grasps legs 44 in one hand. He then pivots bracket 70 upwardly from between legs 44 by pushing up on lip 74 with his index finger while simultaneously squeezing legs 44 toward each other, against their inherent natural bias, with the same hand. As a result of legs 44 being squeezed together the hooks 47 become disengaged from vertical wire members 28, 29. The operator can then fully open door 40 by pulling outwardly on legs 44 with the same hand. Since the operator needs only one hand to open the door he can use his other hand to grab the animal contained within the cage before the door is fully opened, thus preventing that animal from bolting out of the partially opened door and escaping.

In the preferred embodiment, door 40 is also provided with a guide assembly 48 for guiding the legs 44 when they are squeezed together and when they are released after being deformed. Guide assembly 48 includes an upper and lower connecting member 50, 51 respectively which extend between legs 44 in a direction perpendicular to the longitudinal axis of those legs. The end of each of the connecting members is provided with a J-shaped hook portion 52 having a semicircular first segment 53 which is continuous at one end with its respective connecting member and a second segment 54 which extends from said first segment, parallel to the longitudinal axis of that connector member to which said first segment as attached. These hook portions in conjunction with the connector member define slots 56 which extend perpendicular to the longitudinal axis of legs 44. Legs 44 project through slots 56 and move along the slots when they are deformed or released. Upper connector 50 and lower connector 51 are connected together by a vertical brace 58. This guide assembly assures that the wire legs will be deformed directly toward each other or will move away from each other after being deformed, thus assuring that the hooking portions will either disengage from or reengage with the respective wires simultaneously.

Within one aspect of this invention, the cage assembly 10 of the present invention is also provided with a feed trough 80 which is attached to suitable cage wires below the cage door opening. The upper surface of feed trough 80 extends upwardly to approximately the level of horizontal cage wire member 32. Thus, when door 40 is opened, it rests upon the upper surface of the trough to provide a platform for placing the animal to be worked on. The use of the door as a platform, due to its proximity to the cages, minimizes the handling of the animal and thus decreases the dangers that excessive handling entails.

In view of the foregoing description, those of ordinary skill in the art will undoubtedly envision various modifications which would not depart from the inventive concepts disclosed. It is expressly intended therefore that the foregoing description is illustrative of the preferred embodiment only and it is not to be considered limited. The true spirit and scope of the present invention will be determined by reference to the appended claims.

The embodiments of the invention in which an exclusive property or privilege is claimed are defined as follows:

1. A door for use with cages having a door opening in one side thereof, said door opening having a base and a top comprising:
   a pair of resilient, elongated legs extending between said base and top;
   means for pivotally securing said legs to the base of said door opening, whereby said legs can be selectively positioned over or away from said door opening;
   said cage having receiving means above said door opening;
   engaging means connected to the free ends of said legs for engaging with said receiving means, said engaging means being adapted to be engaged with said receiving means when said legs are positioned over said door opening, said legs being resiliently deformable with respect to each other to releasably disengage said engaging means from said receiving means;
   locking means hingedly connected to said cage for pivotal movement to a locking position between said legs for preventing the deformation of said legs when said engaging means are engaged with said receiving means, said locking means thereby locking said engaging means into engagement with said receiving means when said gate is positioned over said door opening, said locking means being pivotal to a position out of said locking position between said legs for permitting an operator to deform said legs to releasably disengage said engaging means from said receiving means to open said door.

2. A gate for use with cages having a door opening in one side thereof as recited in claim 1 wherein said engaging means comprises generally L-shaped outwardly extending hook portions connected to the free ends of said legs, said hook portions engaging with said receiving means to secure said legs over said door opening, whereby, to open said door, said hook portions are released from said receiving means by squeezing said legs toward each other.

3. A door for use with cages having a door opening in one side thereof as recited in claim 2 wherein said locking means comprises a bracket which is hingedly secured along one edge to said cage above said door opening and which extends between the upper, hooked portions of said legs, said bracket being so positioned that an operator can pivot said bracket from between said legs while simultaneously deforming said legs to release said hooked portions from said receiving means.

4. A door for use with cages having a door opening in one side thereof as recited in claim 3 wherein said bracket is rectangular in shape and has a lip integrally formed with and extending along the edge of said bracket opposite the hinged edge thereof, said lip presenting a surface upon which an operator's finger can be placed for pivoting said bracket from between said legs.

5. A door for use with cages having a door opening in one side thereof as recited in claim 1 wherein said locking means comprises a bracket which is hingedly secured along one edge to said cage above said door opening and which extends between said elongated legs, said bracket being so positioned that an operator can pivot said bracket from between said legs while simultaneously deforming said legs to release said engaging means from said receiving means.

6. A door for use with cages having a door opening in one side thereof as recited in claim 5 wherein said bracket is rectangular in shape and has a lip integrally formed with and extending along the edge of said bracket opposite the hinged edge thereof, said lip presenting a surface upon which an operator's finger can be placed for pivoting said bracket from between said legs.

7. A door for use with cages having a door opening in one side thereof as recited in claim 1 wherein a guide means is provided for the legs as they are deformed, said guide means comprise:
   a pair of cross members extending between said elongated legs, each of said cross members having hooked portions on each of the ends thereof which define a pair of slots through which extend said legs of said door; and
   a brace connected at one end to one of said cross members and at the opposite end to the other of said cross members, said brace being positioned between, and extending in a direction generally parallel to, said legs.

8. A door for use with cages having a door opening in one side thereof as recited in claim 7 wherein said engaging means comprises generally L-shaped outwardly extending hook portions connected to the free end of each of said legs, said hook portions engaging with said receiving means to secure said legs over said door opening, whereby, to open said door, said hook portions are released from said receiving means by squeezing said legs toward each other.

9. A door for use with cages having a door opening in one side thereof as recited in claim 8 wherein said locking means comprises a bracket which is hingedly secured along one edge to said cage above said door opening and which extends between the upper, hooked portions of said legs, whereby said bracket is so positioned that an operator can pivot said bracket from between said legs while simultaneously deforming said legs to release said hooked portions from said receiving means.

10. A door for use with cages having a door opening in one side thereof as recited in claim 9 wherein said bracket is rectangular in shape and has a lip integrally formed with and extending along the edge of said bracket opposite the hinged edge thereof, said lip presenting a surface upon which an operator's finger can be placed for pivoting said bracket from between said legs.

11. An animal cage and door, comprising:
   a wire-type cage having a door opening in one side thereof, said opening being defined at the top by an upper horizontal wire member, at the bottom by a lower horizontal wire member and at the sides by a pair of vertical wire members;

a door comprised of a pair of resilient elongated legs pivotally connected to said lower horizontal wire members, whereby said door can be selectively positioned over or away from said opening, said legs, when positioned over said opening, extending across said upper horizontal wire member;

hook portions attached to the free ends of said legs and extending outwardly therefrom, said hook portions engaging with wire portions of said cage, whereby, to open said gate, said resilient legs are squeezed together, thereby disengaging said hook portions from said cage wire portions;

locking means mounted on said cage for movement to a locking position between said legs to prevent the deformation of said legs when said hook portions are engaged with said cage wire portions, whereby said locking means lock said hook portions into engagement with said wire portions, said locking means being movable to a position out of said locking position between said legs for permitting an operator to deform said legs to releasably disengage said hook portions from said cage wire portions to open said door.

12. An animal cage and door as recited in claim 11 further comprising a food dispenser attached to the outside of said cage, below said lower horizontal wire member which defines the bottom end of said door opening, wherein said food dispenser extends upwardly approximately to the level of said lower horizontal wire member, whereby, when said gate is fully opened, said gate rests upon and is supported in substantially a horizontal position by the top surface of said dispensers thereby defining a platform for holding an animal.

13. An animal cage and door as recited in claim 11 wherein a guide means is provided for the legs as they are deformed, said guide means comprising:

a pair of cross members extending between said elongated legs, each of said cross members having hooked portions on each of the ends thereof which define a pair of slots through which extend said legs of said door; and a brace connected at one end to one of said cross members and at the opposite end to the other of said cross members, said brace being positioned between, and extending in a direction generally parallel to, said legs.

14. An animal cage and door as recited in claim 13 wherein said locking means comprises a bracket which is hingedly secured along one edge to said cage above said door opening and which extends between the upper, hooked portions of said legs, said bracket being so positioned that an operator can pivot said bracket from between said legs while simultaneously deforming said legs to release said hooked portions from said receiving means.

15. An animal cage and door as recited in claim 14 wherein said bracket is rectangular in shape and has a lip integrally formed with and extending along the edge of said bracket opposite the hinged edge thereof, said lip presenting a surface upon which an operator's finger can be placed for pivoting said bracket from between said legs.

16. An animal cage and door as recited in claim 11 wherein said locking means comprises a bracket which is hingedly secured along one edge to said cage above said door opening and which extends between the upper, hooked portions of said legs, said bracket being so positioned that an operator can pivot said bracket from between said legs while simultaneously deforming said legs to release said hooked portions from said receiving means.

17. An animal cage and door as recited in claim 16 wherein said bracket is rectangular in shape and has a lip integrally formed with and extending along the edge of said bracket opposite the hinged edge thereof, said lip presenting a surface upon which an operator's finger can be placed for pivoting said bracket from between said legs.

* * * * *